United States Patent
Jones et al.

(10) Patent No.: US 8,283,029 B2
(45) Date of Patent: *Oct. 9, 2012

(54) MULTILAYER MICROPOROUS FILMS AND COMPOSITES FOR BARRIER PROTECTIVE MATERIALS, AND METHODS

(75) Inventors: Gregory K. Jones, Lebanon, OH (US); Larry Hughey McAmish, Marietta, GA (US); Pai-Chuan Wu, Cincinnati, OH (US); Kenneth L. Lilly, Johnson City, TN (US); Christopher Aaron Shelley, Lebanon, OH (US); Mark Andrew Wendorf, Crown Point, IN (US)

(73) Assignee: Clopay Plastic Products Company, Inc., Mason, OH (US)

( * ) Notice: Subject to any disclaimer, the term of this patent is extended or adjusted under 35 U.S.C. 154(b) by 216 days.

This patent is subject to a terminal disclaimer.

(21) Appl. No.: 12/632,249

(22) Filed: Dec. 7, 2009

(65) Prior Publication Data

US 2010/0159776 A1 Jun. 24, 2010

Related U.S. Application Data

(63) Continuation-in-part of application No. 10/217,880, filed on Aug. 13, 2002, now Pat. No. 7,629,042.

(60) Provisional application No. 60/312,006, filed on Aug. 13, 2001.

(51) Int. Cl.
*B32B 3/26* (2006.01)

(52) U.S. Cl. ........... 428/316.6; 428/317.9; 428/315.5; 428/315.7; 428/315.9

(58) Field of Classification Search ........... 428/316.6, 428/317.9, 319.3, 319.7, 319.9; 442/370, 442/372, 374
See application file for complete search history.

(56) References Cited

U.S. PATENT DOCUMENTS

| | | | |
|---|---|---|---|
| 3,870,593 A | | 3/1975 | Elton et al. |
| 4,728,478 A | | 3/1988 | Sacks et al. |
| 4,791,144 A | * | 12/1988 | Nagou et al. ............ 521/90 |
| 4,824,568 A | | 4/1989 | Allegrezza, Jr. et al. |
| 4,863,792 A | | 9/1989 | Mrozinski |
| 4,968,464 A | | 11/1990 | Kojoh et al. |
| 5,164,258 A | | 11/1992 | Shida et al. |

(Continued)

FOREIGN PATENT DOCUMENTS

FR 2802849 A1 6/2001

(Continued)

OTHER PUBLICATIONS

Omya AG et al., "Calcium carbonates for microporous breathable films Market and product requirements", 10 pages, 2001.

(Continued)

*Primary Examiner* — Hai Vo
(74) *Attorney, Agent, or Firm* — Dinsmore & Shohl LLP (57) ABSTRACT

Embodiments of a breathable multilayer microporous film comprise a first outer film layer, a second inner film layer, and a third outer film layer, wherein each film layer comprises at least one pore-forming filler and one thermoplastic polymer. Each film layer is rendered microporous and breathable by stretching each film layer having the pore-forming filler therein, wherein the first and third outer film layers have first and third maximum pore sizes, respectively, and the second inner film layer has a second maximum pore size different than the respective maximum pore sizes of the first and third outer film layers of the multilayer film. The multilayer microporous film passes ASTM F 1671-03 test.

18 Claims, 3 Drawing Sheets

U.S. PATENT DOCUMENTS

| | | |
|---|---|---|
| 5,196,247 A | 3/1993 | Wu et al. |
| 5,202,173 A | 4/1993 | Wu et al. |
| 5,254,111 A | 10/1993 | Cancio et al. |
| 5,382,461 A | 1/1995 | Wu |
| 5,401,979 A | 3/1995 | Kooijman et al. |
| 5,422,172 A | 6/1995 | Wu |
| 5,531,899 A | 7/1996 | Yen et al. |
| 5,536,413 A | 7/1996 | Bormann et al. |
| 5,592,690 A | 1/1997 | Wu |
| 5,690,949 A | 11/1997 | Weimer et al. |
| 5,830,603 A | 11/1998 | Oka et al. |
| 5,851,937 A | 12/1998 | Wu et al. |
| 5,865,926 A | 2/1999 | Wu et al. |
| 5,955,187 A | 9/1999 | McCormack et al. |
| 6,013,151 A | 1/2000 | Wu et al. |
| 6,045,900 A | 4/2000 | Haffner et al. |
| 6,071,602 A * | 6/2000 | Caldwell ............ 428/304.4 |
| 6,090,441 A | 7/2000 | Vining, Jr. et al. |
| 6,114,024 A | 9/2000 | Forte |
| 6,235,377 B1 | 5/2001 | Dillon et al. |
| 6,261,674 B1 | 7/2001 | Branham et al. |
| 6,264,044 B1 | 7/2001 | Meyering et al. |
| 6,534,150 B1 | 3/2003 | Yamanaka et al. |
| 6,540,949 B2 | 4/2003 | Pip et al. |
| 6,610,163 B1 * | 8/2003 | Mathis ............ 156/229 |
| 7,629,042 B2 * | 12/2009 | Jones et al. ............ 428/316.6 |
| 2003/0005999 A1 | 1/2003 | Wu et al. |

FOREIGN PATENT DOCUMENTS

| | | |
|---|---|---|
| JP | 2001162741 A | 6/2001 |
| WO | 99/59813 A1 | 11/1999 |
| WO | 99/60050 A1 | 11/1999 |
| WO | 01/15898 A1 | 3/2001 |

OTHER PUBLICATIONS

Office Action dated Jan. 19, 2012 as it relates to European Patent Application No. 02753454.4.

* cited by examiner

MULTILAYER MICROPOROUS FILMS AND COMPOSITES FOR BARRIER PROTECTIVE MATERIALS, AND METHODS

CROSS-REFERENCE TO RELATED APPLICATIONS

This application is a continuation-in-part of U.S. patent application Ser. No. 10/217,880 filed Aug. 13, 2002, now U.S. Pat. No. 7,629,042 which claims the benefit of U.S. Provisional 60/312,006 filed Aug. 13, 2001.

TECHNICAL FIELD

The present invention relates to microporous films, and, more particularly, the present invention relates to multilayer microporous films comprising at least two microporous film layers, and to methods for producing multilayer microporous films. The film layers of the multilayer films according to the invention may be provided with controlled pore sizes in order to provide adequate barriers to the penetration of blood and blood-borne pathogens such as viruses.

BACKGROUND

Various materials and processes have been described for use in the production of microporous films. Microporous films are well known for use in various applications, typically where air and moisture permeabilities are desired together with liquid barrier properties.

In particular, microporous films and composites hold promise as inexpensive barrier materials for surgical drapes, protective clothing worn during medical or dental procedures, or other instances where an individual may be exposed to blood or body fluids that may contain pathogenic organisms. Microporous films and composites can prevent the penetration of blood and blood-borne pathogens if the microporous film can be manufactured with a reliably small and controlled maximum pore size. The test methods ASTM F 1670-03 and ASTM F 1671-03 have been developed to test the resistance of barrier materials to penetration by synthetic blood and viruses, respectively. Unfortunately, many microporous films made by standard methodologies fail one or both ASTM penetration tests because the maximum pore size is too large, the pore size is not controlled adequately, or the microporous films are prone to pinholes, tearing and other defects during fabrication or use.

Many of the conventional processes for controlling pore size in microporous films involve the use of expensive additives and/or employ cumbersome processing techniques which are not suitable for large scale production. Accordingly, there is a continuing need for improving the barrier properties of microporous polymer films and composite materials employing such films, by creating adequately small pores in the films and by controlling the maximum pore size and pore-size distribution of the microporous films, particularly while maintaining high production efficiency of such films using standard extrusion equipment and readily available raw materials.

SUMMARY

Accordingly, it is an object of the present invention to provide improved microporous films, and particularly to provide microporous films in which the maximum pore size is controlled to provide adequate barriers to blood and blood-borne pathogens such as viruses. It is a related object of the invention to provide methods for producing such microporous films. These and additional objects are provided by the present invention.

According to one embodiment, a breathable multilayer microporous film which passes ASTM F 1671-03 test, is provided. The breathable multilayer microporous film comprises a first outer film layer, a second inner film layer, and a third outer film layer, wherein each film layer comprises at least one pore-forming filler and one thermoplastic polymer. Each film layer is rendered microporous and breathable by stretching each film layer having the pore-forming filler therein, wherein the first and third outer film layers have first and third maximum pore sizes, respectively, and the second inner film layer has a second maximum pore size different than the respective maximum pore sizes of the first and third outer film layers of the multilayer film. In a further embodiment, the first and third layers comprise polypropylene and calcium carbonate.

According to yet another embodiment, the breathable multilayer microporous film, which passes the ASTM F 1671-03 test, comprises a first outer film layer, a second inner film layer, and a third outer film layer, wherein each film layer comprises at least one pore-forming filler and one thermoplastic polymer. Each layer is rendered microporous and breathable by stretching each film layer having the pore-forming filler therein. The maximum pore size of any of the first, second, or third film layers of the multilayer microporous film is less than about 0.135 microns.

The multilayer microporous films and methods according to embodiments of the present invention allow one to control the maximum pore size of the multilayer films while customizing or optimizing multiple properties of the microporous films and composites in which such films are included.

These and additional objects and advantages will be more fully apparent in view of the detailed description which illustrates various modes contemplated for carrying out the invention. As will be realized, the invention is capable of other different obvious aspects without departing from the invention. Accordingly, the drawings and specification are illustrative in nature and not restrictive.

BRIEF DESCRIPTION OF THE DRAWINGS

While the specification concludes with claims particularly pointing out and distinctly claiming the present invention, it is believed that the invention will be further understood from the following detailed description taken in conjunction with the accompanying drawings in which:

DETAILED DESCRIPTION

Within the context of the present specification, the term "microporous film layer" is intended to refer to a polymer film layer which comprises one or more filler materials and is stretched after film formation to provide the microporosity therein. "Microporous" is used herein to refer to a porous material in which the pores are not readily visible to the naked eye, and typically have a maximum pore size not greater than about several microns. In specific embodiments, the pores are sufficiently small so that the multilayer microporous films are liquid impervious at atmospheric pressure. Additionally, within the context of the present specification, the term "multilayer microporous film" refers to films comprising two or more microporous film layers. The present invention is directed to multilayer microporous films and methods for producing multilayer microporous films. The maximum pore sizes of the respective microporous film layers included in the multilayer microporous films are controlled in order to customize or optimize the overall properties of the multilayer microporous films. In particular, the maximum pore size of the multilayer microporous film Is controlled to form a barrier material that resists the penetration of blood and blood-borne pathogens such as viruses.

In a first embodiment, the multilayer microporous film comprises first and second microporous film layers, wherein the first film layer has a first maximum pore size and the second film layer has a second maximum pore size different from the first maximum pore size. A schematic diagram of a multilayer microporous film according to this embodiment is set forth in FIG. 1. More specifically, the multilayer microporous film 10 comprises a first microporous film layer 12 adjacent to a second microporous film layer 14. As will be discussed in further detail below, the microporous film layers are joined with one another at an interface 16, for example by coextrusion of the film layers, by extrusion coating, or by other lamination technique subsequent to film formation. While the schematic diagrams show the film interfaces as a clearly defined line, one of ordinary skill in the art will recognize that the actual film interface between film layers does not typically comprise a clear line of demarcation. Additionally, in the schematic diagrams, differences in pore size between the film layers are represented by grids of varying sizes. The grids provide no representation of the actual pore size, configuration or count, or of the composition of any individual layer.

Figure 2:
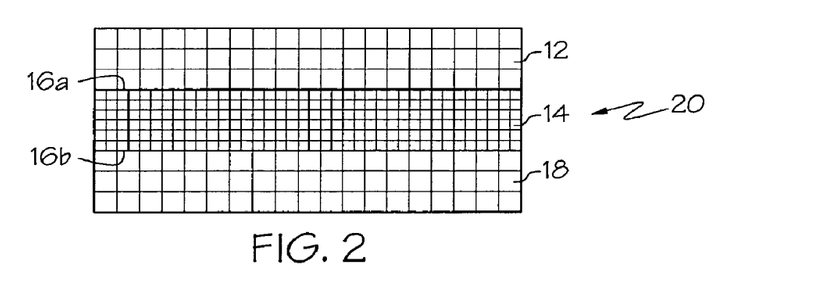
FIG. 2 is a schematic diagram of a multilayer microporous film according to the present invention comprising three microporous film layers.

In a more specific embodiment, the multilayer microporous films according to the invention may comprise a third microporous film layer having a third maximum pore size. This embodiment is illustrated schematically in FIG. 2 wherein a multilayer microporous film 20 comprises first, second and third microporous film layers 12, 14 and 18, respectively. The film layers 12 and 14 are adjacent to each other at interface 16a while the films 14 and 18 are adjacent one another at the interface 16b. In the embodiment of FIG. 2, the second film layer 14 is schematically disclosed as having a smaller maximum pore size relative to the first and third film layers 12 and 18, respectively. However, the multilayer films according to the invention may comprise any arrangement of the layers of relative maximum pore size, whereby the film layer or layers having the largest maximum pore size may be arranged as an outer surface film layer or layers or as an inner film layer wherein both surfaces of the film layer are constrained by adjacent film layers or other layers of a composite product. Similarly, the film layer or layers having the smallest maximum pore size may be arranged as an outer surface film layer or layers or as an inner film layer wherein both surfaces of the film layer are constrained by adjacent film layers or other layers of a composite product. In a more specific embodiment, the microporous film layer having the smallest maximum pore size is positioned between the first and third film layers, as shown by the second film layer 14 positioned between the first film layer 12 and the third film layer 18 in FIG. 2. In another more specific embodiment, the microporous film layer with the largest maximum pore size is positioned between film layers having relatively smaller maximum pore sizes. The maximum pore sizes of the outermost layers may be the same, substantially the same, or different from one another.

Figure 1:
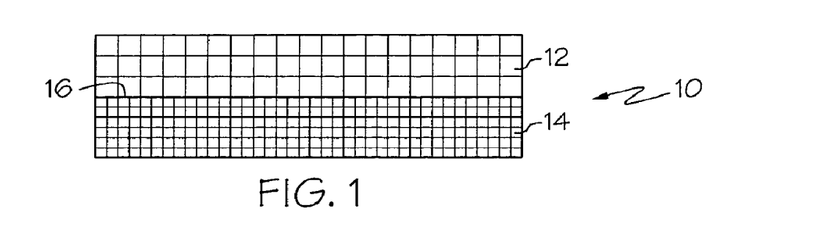
FIG. 1 is a schematic diagram of a multilayer microporous film according to the present invention comprising two microporous film layers.

One skilled in the art will appreciate that the multilayer microporous films according to the present invention may comprise two microporous film layers as shown in FIG. 1, three microporous film layers as shown in FIG. 2, four microporous film layers, or five or more microporous film layers. In many embodiments, less than eight microporous film layers are contemplated.

Importantly, by varying the maximum pore size between the microporous film layers of the multilayer microporous film, it is possible to control the maximum pore size of the multilayer film together with additional properties of the multilayer film to provide customized or optimized combinations of properties. It has surprisingly been discovered that a combination of microporous film layers having different maximum pore sizes will provide a multilayer microporous film which exhibits a maximum pore size substantially characteristic of the one or more layers of the multilayer film which are arranged so as to have no free, unconstrained surfaces. That is, the multilayer microporous films typically exhibit a maximum pore size characteristic of film layers which do not have an exposed surface in the multilayer film or in a composite product in which the multilayer film is employed. For example, with reference to FIG. 2, the multilayer microporous film 20 will exhibit a maximum pore size characteristic of the inner second film layer 14 arranged between the outer first and third film layers 12 and 18, respectively, regardless of whether the film layer 14 has the largest maximum pore size of the three layers or the smallest maximum pore size of the three layers. The surfaces of the film layer 14 are constrained at interface 16a by the first film layer 12 and at 16b by the third film layer 18.

Figure 3:
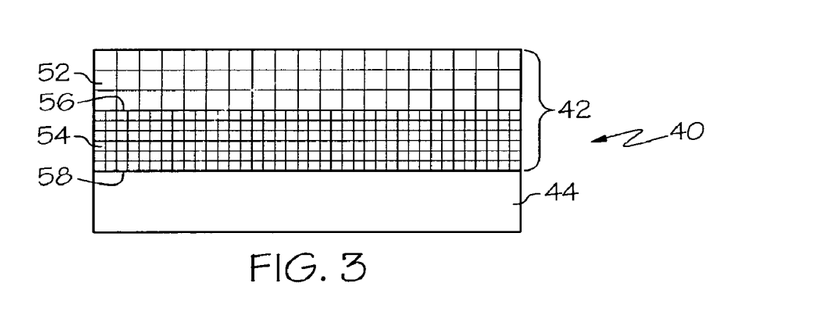
FIG. 3 is a schematic diagram of a multilayer microporous film according to the present invention comprising two microporous film layers and a nonwoven web layer.

Similarly, with reference to FIG. 1, when the multilayer film 10 is formed as a composite material, with one of microporous film layers 12 and 14 arranged adjacent another layer of the composite, and the other of microporous film layers 12 and 14 exposed as an outer surface, the one of layers 12 and 14 which is constrained at both surfaces will characterize the maximum pore size of the multilayer microporous film as employed in the composite. More particularly, with reference to FIG. 3, a multilayer microporous film composite material 40 comprises a multilayer microporous film 42 in combination with a nonwoven layer 44. The multilayer microporous film 42 comprises a first microporous film layer 52 having a first maximum pore size and a second microporous film layer 54 having a second maximum pore size different from the first maximum pore size. The layers 52 and 54 are adjacent one another at interface 56. Thus, one surface of the second microporous film layer 54 is adjacent the first microporous film layer 52 at interface 56 while the other surface of the microporous film layer 54 is constrained at interface 58 by the nonwoven layer 44 of the composite material. As a result, the multilayer microporous film 42 will exhibit a maximum pore size more characteristic of the constrained film layer 54, regardless of whether the film layer 54 has a larger or smaller maximum pore size as compared with the microporous film layer 52.

Figure 4:
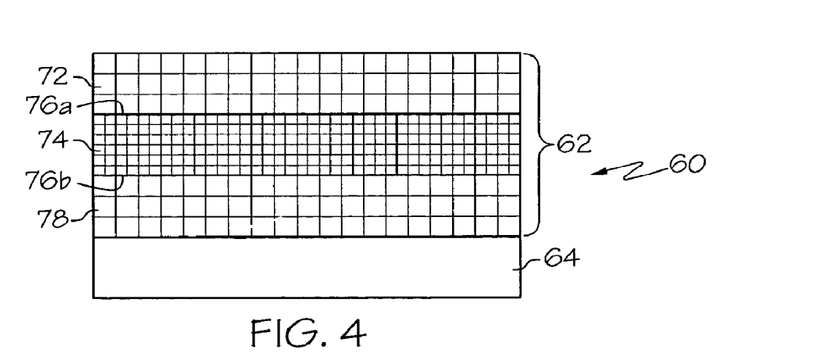
FIG. 4 is a schematic diagram of a multilayer microporous film according to the present invention comprising three microporous film layers and a nonwoven web layer.

The multilayer microporous films according to the present invention may comprise additional layers to form composite materials as described, for example, in FIG. 4. FIG. 4 sets forth an additional embodiment of a multilayer microporous film composite containing a non-microporous film layer. More specifically, with reference to FIG. 4, the multilayer microporous film composite material 60 comprises a multilayer microporous film 62 and a nonwoven layer 64. The multilayer microporous film 62 comprises first, second and third microporous film layers 72, 74 and 78, respectively, wherein layers 72 and 74 are joined at interface 76a and layers 74 and 78 are joined at interface 76b. Although not shown in the figures, the nonwoven layer may be arranged between two of the film layers, if desired. Additional multilayer microporous films including non-microporous layers to form composites will be apparent to those of ordinary skill in the art and are included within the scope of the invention.

In the three layer embodiments of the microporous film layers shown in FIGS. 2 and 4, the first and third film layers, 12 and 18 in FIGS. 2 and 72 and 78 in FIG. 4, are arranged as outer layers and are schematically indicated as having similar maximum pore sizes different from that of the second, inner film layer 14 and 74, respectively. In accordance with the three film layer embodiment of the multilayer microporous films according to the invention, the first, second and third maximum pore sizes of the first, second and third layers may be of any relative maximum pore size with respect to one another, as long as at least two of the layers have differing maximum pore sizes. Thus, the first and third layers as shown in FIGS. 2 and 4 may have maximum pore sizes which are the same, substantially the same, or different from one another. Additionally, the film layer or layers with the largest or smallest maximum pore size may be provided in any layer order as desired in order to obtain a desired multilayer microporous film maximum pore size.

The microporous film layers of the multilayer films according to the present invention may be provided with differing pore sizes by a variety of techniques. In one embodiment, the first and second film layers having differing maximum pore sizes are formed of different polymer compositions which, upon stretching, provide different maximum pore sizes in the respective films. For example, when the first and second film layers are formed of first and second polymer compositions, respectively, the polymer compositions can be selected such that one of the compositions provides a film layer having a smaller or larger maximum pore size as compared with the other composition(s).

While suitable polymer compositions for use in microporous film layers of the multilayer films according to the present invention are discussed in further detail below, polymers which are suitable for use in providing microporous film layers having relatively smaller maximum pore sizes include, but are not limited to, polypropylene homopolymers and copolymers, nylon polyamides, and the like, while polymers suitable for use in film layers having relatively larger maximum pore sizes include, but are not limited to, ultra low density polyethylene (ULDPE), low density polyethylene (LDPE), linear low density polyethylene (LLDPE), medium density polyethylene (MDPE), and high density polyethylene (HDPE). Additional combinations of polymers for use as the first and second film layers of the multilayer films will be apparent to those of ordinary skill in the art. While not wishing to be bound by theory, it is believed that a polymer's modulus (the slope of its stress-strain curve) and/or natural draw may influence the pore size thereof. It is also believed that the number of pores in a layer may be varied by polymer composition.

In a more specific embodiment, wherein the multilayer microporous film comprises three microporous film layers as set forth in FIG. 2, the second film layer is positioned between the first and third film layers and is formed of a second polymer composition which is different from the first and third polymer compositions from which the first and third layers are formed, respectively. In one embodiment, the second polymer composition is selected such that the second film layer has a larger maximum pore size as compared with the maximum pore size of the first and third layers. In an alternate embodiment, the second polymer composition is selected such that the second film layer has a smaller maximum pore size as compared with the first and third film layers. In yet further embodiments, the first and third layers have substantially the same or the same maximum pore sizes.

More specifically, in one embodiment of the multilayer microporous film, a first composition of (a) from about 35% to about 45% by weight of linear medium density polyethylene, (b) from about 3% to about 10% by weight of low density polyethylene, (c) from about 40% to about 55% by weight calcium carbonate filler particles, and (d) from about 1% to about 6% by weight of one or more components from a group consisting of the following: pigments, opacifiers, processing aids, antioxidants, stabilizers (light, UV, heat, etc.), tackifiers, and polymeric modifiers is prepared, and a second composition of (a) from about 35% to about 50% by weight of polypropylene homopolymer, (b) from about 2% to about 15% of one or more of low density polyethylene and polypropylene copolymers, (c) from about 40% to about 60% by weight of calcium carbonate particles, and (d) from about 0.1% to about 10% by weight of one or more components from a group consisting of the following: surfactants, pigments, opacifiers, processing aids, antioxidants, stabilizers (light, UV, heat, etc.) and polymeric modifiers is prepared. The first and second compositions are individually melt blended in conventional extrusion apparatus and are then passed through an extrusion combining block such that a three layer structure is produced with one layer of the second composition between two layers of the first composition. The layers are coextruded either into a nip of rollers, onto a chill cast roll, or into a blown film tube, to form a solid film at a speed on the order of about 250 fpm to about 1200 fpm without draw resonance, and an incremental stretching force is applied to the multilayer film in a substantially uniform manner across the film and throughout its depth to provide a multilayer microporous film.

The multilayer film of this embodiment facilitates high speed production as the polyethylene outer layers exhibit improved melt stability as compared with the polypropylene core layer and surprisingly allow production of an extrusion laminated multilayer film at higher speeds as compared with extrusion of a polypropylene film alone.

Another specific embodiment of the multilayer microporous film may be obtained by providing a first composition of (a) from about 35% to about 45% by weight of linear medium density polyethylene, (b) from about 3% to about 10% by weight of low density polyethylene, (c) from about 40% to about 55% by weight calcium carbonate filler particles, and (d) from about 1% to about 6% by weight of one or more components from a group consisting of the following: pigments, opacifiers, processing aids, antioxidants, stabilizers (light, UV, heat, etc.), tackifiers, and polymeric modifiers; and providing a second composition of (a) about 35% to about 50% by weight of high density polyethylene, (b) from about 3% to about 10% of low density polyethylene, (c) from about 40% to about 60% by weight of calcium carbonate particles, and (d) about 0.1% to about 10% by weight of one or more components from a group consisting of the following: surfactants, pigments, opacifiers, processing aids, antioxidants, stabilizers (light, UV, heat, etc.) and polymeric modifiers. The first and second compositions are individually melt blended in conventional extrusion apparatus and are then passed through an extrusion combining block such that a three layer structure is produced with one layer of the second composition between two layers of the first composition. The film is extruded and stretched as described above.

In another embodiment, the first and second film layers are provided with different maximum pore sizes by employing different fillers in the respective layers. The fillers may differ by composition, size, shape, surface coating, and/or any other property which will vary the pore size of the resulting stretched microporous film layer. For example, the first film layer may comprise a first filler having a first average particle size, while the second film layer comprises a second filler having a second average particle size different from the first average particle size. The first and second fillers may have the same or different chemical composition and the first and second film layers may have the same or different polymer compositions. Without intending to be bound by theory, a film layer having a smaller average particle size filler will, with all other variables constant, provide a microporous film layer having a smaller maximum pore size while a larger average particle size filler will, with all other variables constant, provide a microporous film layer having larger maximum pore sizes.

In a more specific embodiment, the microporous film layers of the multilayer microporous film are formed of the same polymer composition and comprise filler of the same chemical composition, with the average particle size of the filler being varied in at least two adjacent layers. In a more specific embodiment, the filler employed in the respective film layers comprises calcium carbonate. Calcium carbonate is typically available in average particle sizes ranging from about 0.1 micron to about 2.5 microns. Calcium carbonate in the lower average particle size ranges is typically formed by precipitation while calcium carbonate in the higher average particle size ranges is typically formed by grinding. In a further embodiment of the three layer multilayer microporous film as described in FIG. 3, the second film layer comprises a second filler having an average particle size smaller than the average particle sizes of the first and third fillers employed in the first and third film layers, and the second film layer is arranged between the first and third film layers whereby the second film layer has a smaller maximum pore size as compared with the first and third film layers. In an alternate embodiment, the second film layer comprises a second filler having a larger average particle size as compared with the first and third fillers employed in the first and third film layers, respectively, and the second layer is arranged between the first and third film layers, whereby the second film layer has a larger maximum pore size as compared with the first and third layers.

Suitable fillers for use in the respective film layers include, but are not limited to, various inorganic and organic materials, including, but not limited to, metal oxides, metal hydroxides, metal carbonates, organic polymers, derivatives thereof, and the like. Preferred fillers include, but are not limited to, calcium carbonate, diatomaceous earth, titanium dioxide, and mixtures thereof. Thus, the composition of the filler may be varied from film layer to adjacent film layer in order to provide different maximum pore sizes to the respective layers after stretching. One typical film layer composition for this embodiment comprises a combination of (a) from about 35% to about 45% by weight of linear low density polyethylene, (b) from about 3% to about 10% by weight of low density polyethylene, (c) from about 40% to about 55% by weight calcium carbonate filler particles, and (d) from about 1% to about 6% by weight of one or more components of a group consisting of the following: pigments, processing aids, antioxidants and polymeric modifiers, with the average particle size of the calcium carbonate filler particles being varied from layer to layer.

Alternately, the shape of the filler, i.e., plates, rods, spears, flakes, spheres, chunks, bricks, may be varied from film layer to adjacent film layer in order to vary the pore size of the respective film layers. In view of the present disclosure, one skilled in the art will be able to easily determine appropriate combinations of various fillers for providing adjacent film layers of varying maximum pore size.

Similarly, the fillers of the respective film layers can be provided with different surface coatings or differing amounts of surface coatings in order to vary the pore size of the respective microporous film layers. Suitable filler coatings are known in the art and include, but are not limited to, silicone glycol copolymers, ethylene glycol oligomers, acrylic acid, hydrogen-bonded complexes, carboxylated alcohols, ethoxylates, various ethoxylated alcohols, ethoxylated alkyl phenols, ethoxylated fatty esters, carboxylic acids or salts thereof, for example, stearic acid or behenic acid, esters, fluorinated coatings, or the like, as well as combinations thereof.

Further, the amount of filler which is employed in the respective film layers may be varied in order to vary the pore size of the respective layers. For example, for a given constant permeability rate, higher concentrations of filler will, with most other variables constant, provide smaller maximum pore sizes, as the film is stretched less. Conversely, for a given constant permeability rate, a lower concentration of particles will provide a microporous film having a larger maximum pore size, as the film must be stretched more to achieve the target permeability rate. One skilled in the art will, in view of the present disclosure, be able to determine suitable variations in the amount of filler employed in respective layers.

The above embodiments allow the variation in pore size between adjacent microporous film layers to be obtained in coextruded films, in extrusion coated films, or in films which are individually extruded and subsequently laminated. However, additional techniques may be employed for varying the pore size of microporous thin films which are not coextruded, but which are formed by extrusion coating a second film layer on a stretched first film layer, or which are laminated together to form a multilayer microporous film subsequent to extrusion and stretching. For example, variations in the stretching temperature, rate, method and/or gear configuration can provide microporous film layers of identical composition with different maximum pore sizes. Without being limited by theory, it is believed that the stretching process variables will affect various properties, for example, the modulus and/or the natural draw, of a film layer polymer composition and thereby affect the maximum pore size resulting from the stretching process. Thus, stretching at higher temperatures may reduce the modulus and/or the natural draw and therefore alter the maximum pore size.

The individual microporous film layers employed in the multilayer films of the invention may be of any suitable thickness which provides desired properties, particularly breathability. Suitably, the microporous film layers will individually have a thickness of from about 0.1 mil to about 10 mils, more specifically from about 0.25 mil to about 5 mils. Additionally, the pores are of a size sufficiently small as to not be readily visible to the naked eye. Preferably, the pores are sufficiently small as to render the multilayer microporous film liquid impervious at atmospheric pressure conditions. In one embodiment, the multilayer microporous films have a maximum pore size in the range of about 0.01 to about 0.25 micron. In another embodiment, the multilayer microporous films exhibit a maximum pore size sufficiently small for the films to act as viral barriers, i.e., not greater than about 0.10 to about 0.13 micron. One skilled in the art will recognize of course that other factors, including, but not limited to, pore count and configuration and film layer thicknesses, will affect these properties. Advantageously, the multilayer microporous films will also exhibit good air and water vapor transmission. Typically, the films will exhibit a water vapor transmission rate (WVTR) of greater than about 500 g/m$^2$/day. In more specific embodiments, the microporous multilayer films will exhibit WVTRs of greater than about 1500 g/m$^2$/day, greater than about 2500 g/m$^2$/day, greater than about 3000 g/m$^2$/day, or greater than about 4000 g/m$^2$/day, as measured according to ASTM E96E.

The polymers from which the microporous film layers may be formed comprise thermoplastic polymers that are processable into a film and stretchable to form micropores therein. Suitable polymers for the films include, but are not limited to, polyolefins, for example, polyethylene homopolymers and copolymers, and polypropylene homopolymers and copolymers, functionalized polyolefins, poly(styrene-butadiene-styrene), poly(styrene-isoprene-styrene), poly(styrene-ethylene-butylene-styrene), polyesters, poly(ester-ether), polyamides, including nylons, poly(ether-amide), polyether sulfones, fluoropolymers, polyurethane and the like. Polyethylene homopolymers include those of low, medium or high density and/or those formed by high pressure or low pressure polymerization. Polyethylene and polypropylene copolymers include, but are not limited to, copolymers with C4-C8 alpha-olefin monomers, including 1-octene, 1-butene, 1-hexene and 4-methyl pentene. The polyethylene may be substantially linear or branched, and may be formed by various processes known in the art using catalysts such as Ziegler-Natta catalysts, metallocene or single-site catalysts or others widely known in the art. Examples of suitable copolymers include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), and ethylene-propylene rubber, and/or polyolefin terpolymers thereof. Additionally, thermoplastic polymers suitable for use herein include those which may be biodegradable or environmentally degradable. A number of biodegradable thermoplastic polymers suitable in the practice of the invention are of the normally-solid oxyalkanoyl polymers or dialkanoyl polymers represented by poly(caprolactone) or poly(ethylene adipate); polysaccharides or modified polysaccharides such as starch-resin compositions that may be film-formed.

Suitable nonwoven fibrous layers or webs may comprise, but are not limited to, fibers of polyethylene, polypropylene, polyesters, rayon, cellulose, nylon, and blends of such fibers. A number of definitions have been proposed for nonwoven fibrous webs. The fibers are usually staple fibers or continuous filaments. As used herein "nonwoven fibrous web" is used in its generic sense to define a generally planar structure that is relatively flat, flexible and porous, and is composed of staple fibers or continuous filaments. Typically, such webs are spunbonded, carded, wet laid, air laid or melt blown. For a detailed description of nonwovens, see "Nonwoven Fabric Primer and Reference Sampler" by E. A. Vaughn, Association of the Nonwoven Fabrics Industry, 3d Edition (1992). Such nonwoven fibrous webs typically have a weight of about 5 grams per square meter to 75 grams per square meter, more specifically about 10 to about 40 grams per square meter, and may be included in the films of the invention by extrusion lamination, adhesive lamination or other lamination techniques known in the art.

The multilayer microporous films may be produced according to various methods. In one embodiment, at least two film layers are coextruded and stretched to render them microporous, wherein the first film layer has at least one component which differs from that of the second film layer, which component is adapted to cause the one film to have a maximum pore size upon stretching which is different from that of the second film layer upon stretching. In this embodiment, the film layers may be combined with one or more layer materials, for example, a nonwoven fiber layer, before or after stretching. Alternatively, the microporous film layers may be formed individually, after which the film layers are laminated together and stretched. One skilled in the art will appreciate that the individual layers may be stretched either before lamination or after lamination with each other or with one or more layer materials, for example, a nonwoven fiber layer.

A number of different stretching techniques known in the art may be employed to stretch the microporous-formable film layers. For example, the film layers may be stretched by cross direction (CD) intermeshing, and/or machine direction (MD) intermeshing. Techniques to stretch films and laminates by CD or MD intermeshing are taught in U.S. Pat. No. 5,865,926, which in incorporated by reference. In addition, CD intermeshing, and/or MD intermeshing, may be employed with machine direction orientation (MDO) stretching and/or CD tentering stretchers, in any desired order. Thus, in one embodiment CD intermesh stretching and/or MD intermesh stretching is performed first and followed by MDO stretching. In an alternate embodiment, MDO stretching is performed first and followed by CD intermesh stretching, and/or MD intermesh stretching. Additional variations thereof may also be used. While various specific techniques for these and other stretching techniques are known in the art and may be employed, the following descriptions for suitable stretching techniques and equipment suitable for use herein are described.

The CD and MD intermeshing and MDO stretchers may be employed to produce the multilayer microporous films or composites of nonwoven fibrous web and multilayer microporous films of this invention. The results of this stretching produces composites that have excellent breathability and liquid-barrier properties, yet provide soft, cloth-like textures.

In one embodiment, the multilayer microporous films according to the invention may be embossed to produce a pattern of varying thickness across or along the film. Embossing may be conducted either before or after stretching which renders the films microporous. In a more specific embodiment, embossing of the films is conducted prior to any stretching to render the films microporous. Any of the stretching techniques discussed above may be employed on embossed films according to this embodiment. In a more specific embodiment, a multilayer microporous film is formed by embossing a multilayer film and stretching the embossed film by machine direction orientation, using, for example, a stretch ratio of about 4, of about 3, or of about 2 or less. Any embossing techniques suitable for use with polymer films may be employed. In one embodiment, embossing may be conducted using a square embossing pattern such as Microflex® (250 emboss lines per inch, 1 mil embossing depth) Velvaflex® (150 emboss lines per inch, 1.8 mil embossing depth) or Taff-a-flex® (60 emboss lines per inch, 4 mil embossing depth), each of which are registered trademarks of Clopay Plastic Products Company, Inc. of Mason, Ohio.

The following examples demonstrate specific embodiments of the multilayer microporous films according to the invention. In the examples, and throughout the specification, parts and percentages are by weight unless otherwise specified. The examples were tested for resistance to penetration by viral particles using method ASTM F 1671-03, as described below. It is generally accepted in the industry that if a material passes ASTM F 1671-03, the material by definition will also pass ASTM F 1670-03, because the test methodology is similar but ASTM 1671-03 is the more rigorous test. Additionally, reference to measured maximum pore size herein refers to maximum pore size (MPS) as measured using a capillary flow porometer manufactured by Porous Materials, Inc. of Ithaca, N.Y. This method measures the MPS (in microns) for microporous films and nonwoven composites by displacement of a wetting liquid from the pores of a sample by a non-reacting gas. Celgard® 2400, available from Celgard Inc. of Charlotte, N.C., was used as a control and has an MPS value of 0.037 micron in this test. Additionally, reference to measured air permeability refers to air permeability as measured by a procedure wherein the volumetric flow rate of air passing through the sample is measured when a supply of air at 90 psig is presented to one side of a test film. Celgard 2400 was used as a control and has an airflow value of 48 in this test.

ASTM F 1671-03

The following is a summary of test method ASTM F 1671-03. Details of the method, including the scope, significance and use of the test, definition of terms, and interpretation of the data can be found in the actual ASTM method, which is incorporated by reference herein in its entirety.

In summary, ASTM F 1671-03 tests specimens of protective clothing and protective materials are exposed to a nutrient broth containing a nonharmful surrogate virus for a specified time and pressure sequence. The test specimens are inspected both visually and by an assay procedure to detect liquid and viral penetration. Each test is graded as 'pass' or 'fail,' where 'pass' means that no viable viruses have penetrated the protective material, and 'fail' means there is any evidence of liquid or viral penetration.

The surrogate virus used in this test is Phi-X174 bacteriophage. This virus is similar in size and shape to the pathogenic blood-borne viruses Hepatitis B, Hepatitis C, and HIV, but Phi-X174 is not dangerous to humans.

Figure 5:
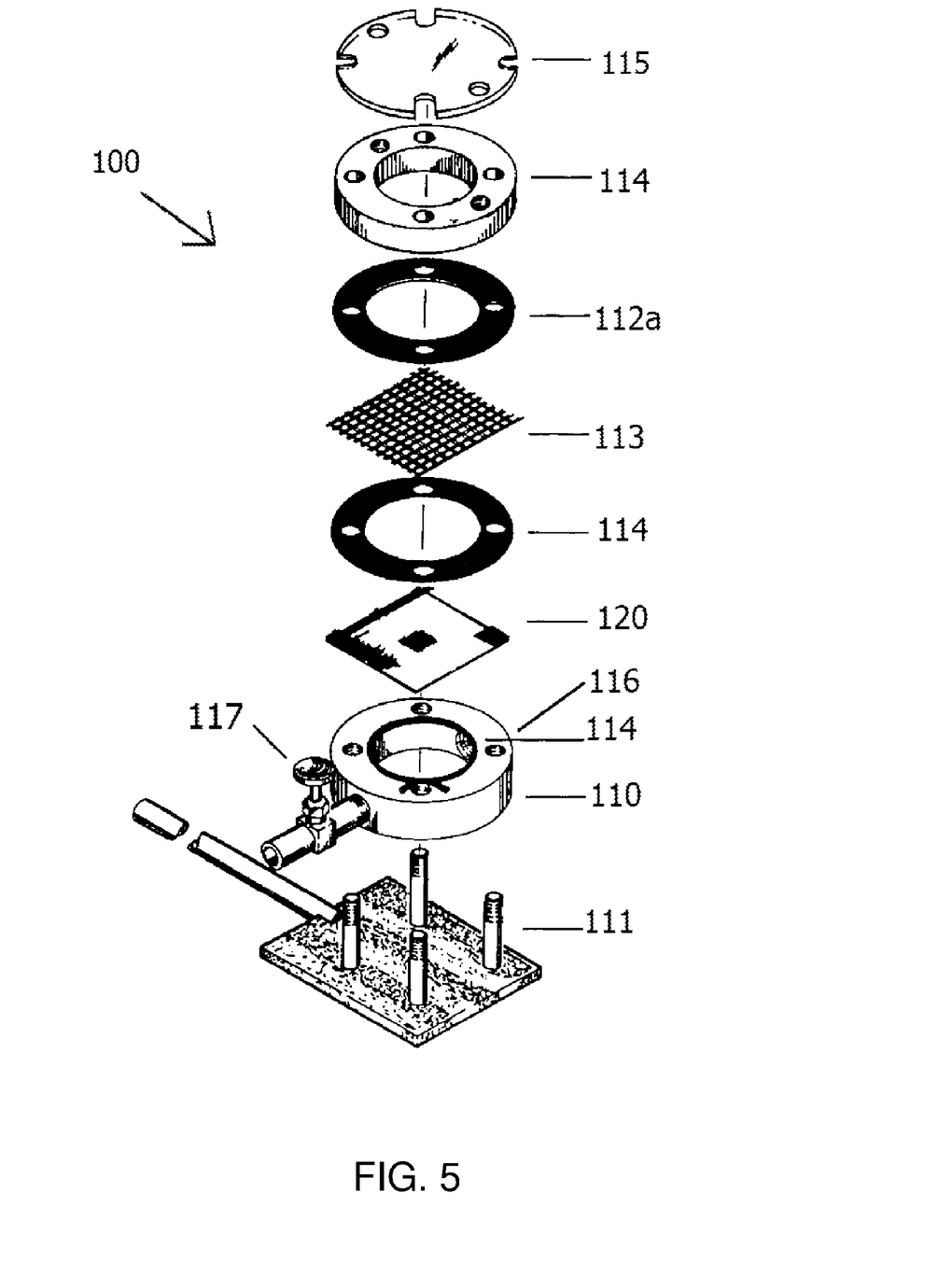
FIG. 5 is an exploded view of the ASTM F 1671-03 penetration test cell, with optional retaining screen.

FIG. 5 illustrates an exploded view of the penetration test cell used. The test cell 100 comprises a cell body 110, a cell support plate 111, a flange cover 114, and a transparent observation cover 115. The test material 120 is inserted between the cell body 110 and flange cover 114. Gaskets 112 form watertight seals between the sample and test cell parts. An optional retaining screen 113 and extra gasket 112a may be used to support test materials that may be prone to rupture during the pressurized portion of the test. The cell body 110 also has a top port 116 and drain valve 117, which are used to add and remove, respectively, the virus-containing nutrient broth that is exposed to the test material.

Figure 6:
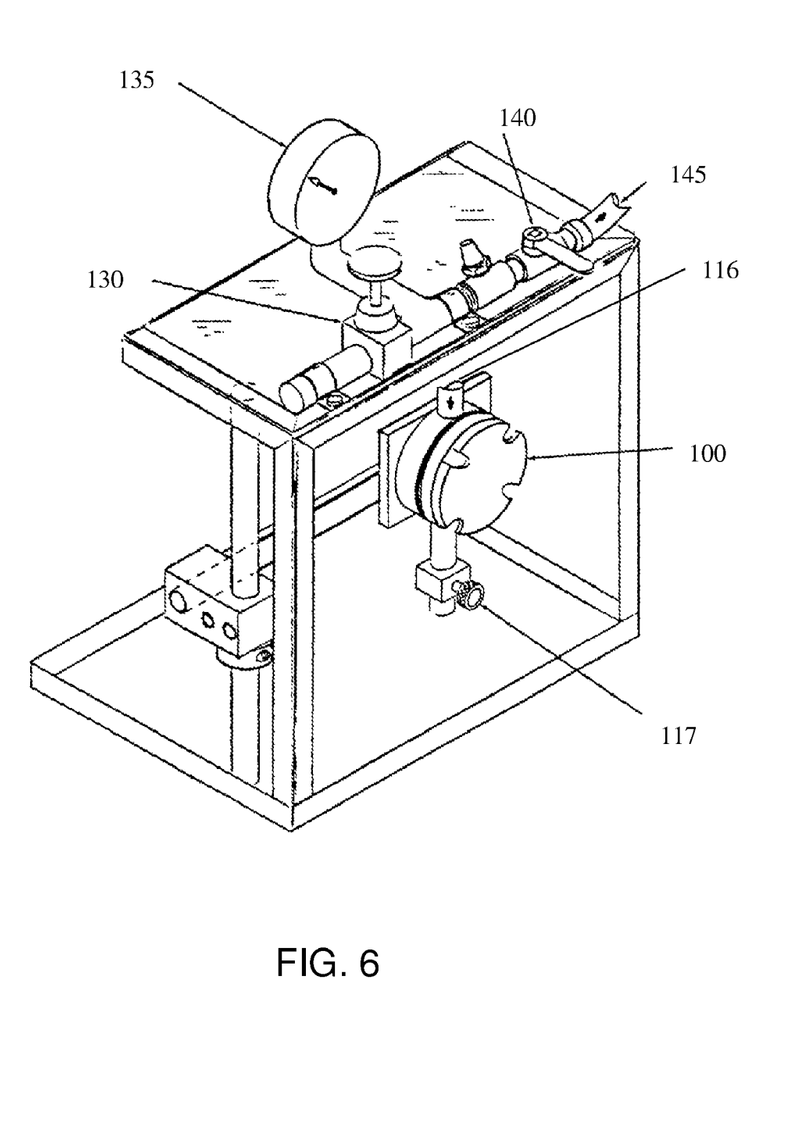
FIG. 6 is a side view of the ASTM F 1671-03 test apparatus.

To conduct the test, the penetration test cell parts and the test materials are first suitably sterilized. The sterile test cell and test material are assembled as shown in FIG. 5. The test cell is sealed by torquing the bolts on the cell to 120 lb-in each. The penetration cell 100 is then mounted on the test apparatus as shown in FIG. 6. The drain valve 117 is closed. Approximately 60 mL of a nutrient broth containing the surrogate Phi-X174 bacteriophage is carefully transferred to the test cell body 110 through the top port 116. The test material 120 is then observed for 5 minutes through the transparent cover 115 to determine if any liquid leaks through the test material 120. If there is no liquid observed, an air pressure line 145 is connected to the top port 116. The gas pressure regulator 130 is opened to slowly raise the test cell pressure to 2 psig, as read on the pressure gauge 135. The test cell 100 is held at constant pressure for 1 minute, and the test material 120 observed to determine if any liquid penetrates the material. The pressure is then released via a venting valve 140, and the penetration test cell 100 is allowed to sit at ambient pressure for an additional 54 minutes. Once again, the test material 120 is observed to determine if any liquid penetrates the material. If, at any time during this portion of the test, liquid can be seen to penetrate the test material 120, the test is terminated and the test material is reported to FAIL.

If the test material 120 does not appear to allow liquid leakage, the drain 117 is opened to remove the virus-containing nutrient broth. The test cell 100 is then placed horizontally on a lab bench, and the transparent cover 115 is removed. The surface of the test material 120 facing toward the transparent cover 115 is carefully rinsed with a sterile solution, and the rinsings are assayed for the presence of live Phi-X174 bacteriophage. If any live virus is found to penetrate a test material, that material is reported to FAIL. If no live virus is found to penetrate the test material, that material is reported to PASS.

EXAMPLE 1

In this example, multilayer microporous films having three microporous film layers and of structure ABA or BAB are prepared using the following melt blended polymer-filler compositions A and B:

Composition A: 53% calcium carbonate, 41% medium density polyethylene, 4% titanium dioxide, 1% CaO masterbatch, and 1% processing aid.

Composition B: 55% calcium carbonate, 37% homopolymer polypropylene resin, 5% low density polyethylene resin, 3% titanium dioxide masterbatch and 1% CaO masterbatch.

The film layers as described in Table 1 are coextruded using standard cast film equipment and process conditions to form multilayer films having a basis weight of 53-60 grams per square meter (gsm) prior to stretching. The coextruded film layers are subsequently stretched via the CD and MD intermeshing processes. The CD engagement is 0.120" and the MD engagement is 0.040". CD stretching is accomplished by passing the film at 200 fpm over a roll heated to 180° F. immediately before stretching, but the film temperature is not controlled during MD stretching. The maximum pore size and the air flow of each multilayer microporous film are measured and are set forth in Table 1. For comparison purposes, a single layer microporous film of each of compositions A and B is also prepared using similar extrusion and stretching conditions. The maximum pore size and the air flow of these single layer microporous films are also measured and are set forth in Table 1.

TABLE 1

| Sample No. | Core Layer Basis Weight | ABA | |
|---|---|---|---|
| | | MPS (micron) | Airflow |
| 1A | 40 gsm | 0.112 | 43 |
| 1B | 30 gsm | 0.118 | 62 |
| 1C | 20 gsm | 0.119 | 60 |
| 1D | 10 gsm | 0.127 | 88 |
| Single | 35 gsm | 0.119 | 44 |

TABLE 1-continued

Layer B

| | | BAB | |
|---|---|---|---|
| Sample No. | Core Layer Basis Weight | MPS (micron) | Airflow |
| 1E | 40 gsm | 0.157 | >100 |
| 1F | 30 gsm | 0.164 | >100 |
| 1G | 20 gsm | 0.136 | 92 |
| 1H | 10 gsm | 0.135 | 63 |
| Single Layer A | 35 gsm | 0.180 | >100 |

The results set forth in Table 1 demonstrate that while the single layer A exhibits a high air flow, it also has a relatively large maximum pore size, which is undesirable for applications requiring high barrier properties. On the other hand, the single layer B exhibits a smaller maximum pore size suitable for various barrier applications, but this single layer microporous film exhibits relatively low air flow. Samples 1A-1H according to the present invention demonstrate the benefits of the multilayer microporous films of the invention. In samples 1A-1D, the inner layer is formed of a microporous film layer having a smaller maximum pore size as compared with the maximum pore size of the outer layers. Surprisingly, the multilayer microporous film exhibits a maximum pore size characteristic of the inner film layer and, as the inner core layer basis weight is reduced, increased air flow. These samples demonstrate the ability to customize or optimize various properties of the multilayer microporous film. For example, air flow, an indication of breathability, of the multilayer microporous film may be increased without sacrificing barrier properties.

In samples 1E-1H, wherein the layer having the largest maximum pore size is arranged as the inner core layer and the layers having the smaller maximum pore size are arranged as the outer layers, the multilayer microporous film surprisingly exhibits high air flow as compared with the single microporous layer B and, as the basis weight of the inner core layer is decreased, a decreasing maximum pore size.

A comparison of samples 1A-1D with samples 1E-1H shows the unexpected influence of the arrangement of the individual film layers on the overall properties of the multilayer microporous film. Particularly, the inner core layer having no free, unconstrained surfaces appears to dominate the properties of the multilayer microporous film.

EXAMPLE 2

In this example, multilayer microporous films having three microporous film layers and of structure ABA or BAB are prepared using the following melt blended polymer-filler compositions A and B:

Composition A: 53% calcium carbonate, 41% medium density polyethylene, 4% titanium dioxide, 1% CaO masterbatch, and 1% processing aid; and Composition B: 55% calcium carbonate, 37% homopolymer polypropylene resin, 5% low density polyethylene resin, 3% titanium dioxide masterbatch and 1% CaO masterbatch.

The film layers as described in Table 1 are coextruded using standard cast film equipment and process conditions to form multilayer films having a basis weight of 53-60 grams per square meter (gsm) prior to stretching. The coextruded film layers are subsequently stretched via the CD and MD intermeshing processes. The CD engagement is 0.120" for most samples, but the CD engagement is varied for some samples as noted in the table. The MD engagement is held constant at 0.040". CD stretching is accomplished by passing the film at 200 fpm over a roll heated to 180° F. immediately before stretching, but the film temperature is not controlled during MD stretching. The maximum pore size of each multilayer microporous film is measured and are set forth in Table 2. The multilayer microporous films were then tested by ASTM F 1671-03 to determine the viral barrier properties of each film. Three to five replicates from each multilayer microporous film were tested. The percent of replicates reported as PASS are given in Table 2 below.

TABLE 2

| | | ABA | |
|---|---|---|---|
| Sample No. | Core Layer Basis Weight | MPS (micron) | % PASS (ASTM 1671) |
| 2A | 40 gsm | 0.112 | 100 |
| 2B | 30 gsm | 0.118 | 100 |
| 2C | 20 gsm | 0.119 | 60 |
| 2D | 10 gsm | 0.127 | 80 |

| | | BAB | |
|---|---|---|---|
| Sample No. | Core Layer Basis Weight | MPS (micron) | % PASS (ASTM 1671) |
| 2E | 40 gsm | 0.157 | 0 |
| 2F ‡ | 40 gsm | 0.154 | 33 |
| 2G * | 40 gsm | 0.150 | 0 |
| 2H | 30 gsm | 0.164 | 0 |
| 2I | 20 gsm | 0.136 | 60 |
| 2J | 10 gsm | 0.135 | 100 |

‡ Sample 2F is stretched at 0.080" CD engagement
* Sample 2G was stretched at 0.110" CD engagement The results set forth in Table 2 illustrate the barrier properties of the multilayer microporous films of the present invention. In samples 2A-2D, the inner layer is formed of a microporous film layer having a smaller maximum pore size as compared with the maximum pore size of the outer layers. Surprisingly, the multilayer microporous film exhibits a maximum pore size characteristic of the inner film layer. When the maximum pore size of the multilayer microporous film is less than about 0.130 microns, all or most of the samples pass the ASTM F 1671-03 viral barrier test.

In samples 2E-2J, wherein the layer having the largest maximum pore size is arranged as the inner core layer and the layers having the smaller maximum pore size are arranged as the outer layers, the multilayer microporous film has a measured maximum pores size that is greater than corresponding films with the smaller maximum pore size in the inner core layer. The ASTM F 1671-03 test results confirm that these larger maximum pore sizes result in most of the test material replicates failing the viral barrier test. Only for samples 2I and 2J, where the maximum pore size is about 0.135 microns, do most or all of the replicates pass the test.

The Examples and specific embodiments described herein are for illustrative purposes only and are not intended to be limiting of the invention defined by the following claims. Additional embodiments and examples within the scope of the claimed invention will be apparent to one of ordinary skill in the art.

What is claimed is:

1. A breathable multilayer microporous film, comprising a first outer film layer, a second inner film layer, and a third outer film layer, wherein each film layer comprises at least one pore-forming filler and one thermoplastic polymer, with each layer rendered microporous and breathable by stretching each film layer having the pore-forming filler therein, wherein the first and third outer film layers have first and third maximum pore sizes, respectively, and the second inner film layer has a second maximum pore size smaller than the respective maximum pore sizes of the first and third outer film layers of the multilayer film, wherein the maximum pore size of the multilayer microporous film is from about 0.10 to about 0.13 microns, and wherein the multilayer microporous film passes ASTM F 1671-03 test.

2. The multilayer microporous film according to claim 1, wherein each film layer is formed of a polymer compositions consisting essentially of one or more polymers selected from the group consisting of polyethylene homopolymers, polypropylene homopolymers, copolymers of ethylene and propylene, copolymers of ethylene and/or polypropylene with one or more C4-C8 alpha olefin monomers, and mixtures of two or more of the said polymers.

3. The multilayer microporous film according to claim 1, wherein the first and third film layers are formed of first and third polymer compositions, respectively, and the second film layer is formed of a second polymer composition different from the first and third polymer compositions.

4. The multilayer microporous film according to claim 3, wherein the first and third polymer compositions comprise ultra low, low, linear low, or medium density polyethylene and the second polymer composition comprises polypropylene or high density polyethylene.

5. The multilayer microporous film according to claim 3, wherein the first and third polymer compositions comprise polypropylene or high density polyethylene and the second polymer composition comprises ultra low, low, linear low, or medium density polyethylene.

6. The multilayer microporous film according to claim 1, wherein the first, second and third microporous film layers are coextruded.

7. The multilayer microporous film according to claim 1 wherein the first and third film layers comprise first and third fillers, respectively, and the second film layer comprises a second filler different from the first and third fillers.

8. The multilayer microporous film according to claim 7, wherein the filler in at least one layer comprises calcium carbonate pore-forming filler.

9. The multilayer microporous film according to claim 7, wherein the first and third fillers have first and third average particle sizes, respectively, and the second filler has a second average particle size different from the first and third average particle sizes.

10. The multilayer microporous film according to claim 9, wherein the first film layer, the second film layer, and the third film layer comprise the same polymer composition.

11. The multilayer microporous film according to claim 9, wherein the first filler, the second filler, and the third filler have the same chemical composition.

12. The multilayer microporous film according to claim 1, wherein the first and third film layers comprise first and third amounts of filler, respectively, and the second film layer comprises a second amount of filler different from the first and third amounts.

13. The multilayer microporous film according to claim 1, wherein each film layer comprises from about 35 to about 60%, by weight of the respective layer, of thermoplastic polymer, and from about 40% to about 60%, by weight of the respective layer, of at least one pore-forming filler.

14. The multilayer microporous film according to claim 1, wherein one of the first or third film layers is laminated to a nonwoven fabric layer.

15. The multilayer microporous film according to claim 1, wherein the multilayer film is stretched by cross direction (CD) and/or machine direction (MD) intermeshing.

16. The multilayer microporous film according to claim 1, wherein the multilayer film is stretched by cross direction (CD) intermeshing and by machine direction orientation (MDO).

17. The multilayer microporous film according to claim 1, wherein the multilayer film is stretched by cross direction (CD) intermeshing, by machine direction (MD) intermeshing, and by machine direction orientation (MDO).

18. The multilayer microporous film according to claim 1, wherein the multilayer film is stretched by machine direction orientation (MDO).

* * * * *